(12) United States Patent
Ferlitsch

(10) Patent No.: US 8,214,752 B2
(45) Date of Patent: Jul. 3, 2012

(54) SYSTEMS AND METHODS FOR DYNAMICALLY GENERATING USER INTERFACES FOR CONTROLLING A DEVICE WITH A CLIENT SIDE FILTER

(75) Inventor: Andrew R. Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 232 days.

(21) Appl. No.: 11/537,373

(22) Filed: Sep. 29, 2006

(65) Prior Publication Data

US 2008/0082923 A1 Apr. 3, 2008

(51) Int. Cl.
*G06F 3/00* (2006.01)
*G06F 3/048* (2006.01)

(52) U.S. Cl. .................. 715/762; 710/10; 715/779

(58) Field of Classification Search .............. 715/762; 710/10
See application file for complete search history.

(56) References Cited

U.S. PATENT DOCUMENTS

| | | | |
|---|---|---|---|
| 4,604,690 A * | 8/1986 | Crabtree et al. | 713/100 |
| 5,822,221 A * | 10/1998 | Groenteman | 702/188 |
| 5,860,071 A * | 1/1999 | Ball et al. | 707/100 |
| 6,295,527 B1 * | 9/2001 | McCormack et al. | 1/1 |
| 6,453,127 B2 * | 9/2002 | Wood et al. | 399/8 |
| 6,615,266 B1 | 9/2003 | Hoffman, Jr. et al. | |
| 6,654,135 B2 * | 11/2003 | Mitani | 358/1.15 |
| 6,693,722 B1 * | 2/2004 | Mixer, Jr. | 358/1.15 |
| 6,694,384 B1 * | 2/2004 | Moeller et al. | 710/8 |
| 6,910,068 B2 * | 6/2005 | Zintel et al. | 709/220 |
| 7,089,307 B2 * | 8/2006 | Zintel et al. | 709/224 |
| 7,130,895 B2 * | 10/2006 | Zintel et al. | 709/220 |
| RE39,801 E * | 8/2007 | Marbry et al. | 709/220 |
| 7,403,873 B2 * | 7/2008 | Okuno et al. | 702/187 |
| 7,409,443 B2 * | 8/2008 | Bauman et al. | 709/223 |
| 7,412,502 B2 * | 8/2008 | Fearn et al. | 709/223 |
| 7,412,625 B2 * | 8/2008 | Shankar et al. | 714/38 |
| 7,426,052 B2 * | 9/2008 | Cox et al. | 358/1.15 |
| 7,451,200 B2 * | 11/2008 | Metz | 709/223 |
| 7,661,062 B1 * | 2/2010 | Connaughton | 715/234 |
| 7,747,596 B2 * | 6/2010 | Bigioi et al. | 707/705 |
| 7,814,190 B2 * | 10/2010 | Kacin et al. | 709/223 |
| 2002/0145627 A1 | 10/2002 | Whitmarsh et al. | |
| 2002/0194227 A1 | 12/2002 | Day et al. | |
| 2003/0011633 A1 * | 1/2003 | Conley et al. | 345/762 |
| 2003/0120599 A1 * | 6/2003 | Agboatwalla et al. | 705/50 |
| 2003/0184782 A1 | 10/2003 | Perkins et al. | |
| 2004/0190032 A1 | 9/2004 | Ferlitsch | |
| 2005/0027841 A1 | 2/2005 | Rolfe | |
| 2005/0046886 A1 | 3/2005 | Ferlitsch | |
| 2005/0086608 A1 * | 4/2005 | Roessler | 715/764 |
| 2005/0225789 A1 * | 10/2005 | Ferlitsch | 358/1.13 |
| 2005/0231749 A1 * | 10/2005 | Narusawa et al. | 358/1.13 |
| 2006/0221380 A1 * | 10/2006 | Pretz et al. | 358/1.15 |
| 2009/0091628 A1 * | 4/2009 | Narusawa et al. | 348/207.2 |

FOREIGN PATENT DOCUMENTS

EP  1100002  2/2003

(Continued)

*Primary Examiner* — William Bashore
*Assistant Examiner* — David Phantana Angkool
(74) *Attorney, Agent, or Firm* — Austin Rapp & Hardman

(57) ABSTRACT

A method for dynamically constructing a user interface definition is disclosed. A request for an information list is sent. The user interface definition with the information list is received. A filter script is applied to the user interface definition to provide a filtered user interface definition. The filtered user interface definition is sent to an application. The filtered user interface definition is constructed. The filtered user interface definition is displayed.

18 Claims, 8 Drawing Sheets

FOREIGN PATENT DOCUMENTS

| | | |
|---|---|---|
| JP | 08234945 | 9/1996 |
| JP | 2001-134399 | 5/2001 |
| JP | 2001166642 | 6/2001 |
| WO | 02084928 | 10/2002 |
| WO | 03009131 | 1/2003 |
| WO | 200504853 | 1/2005 |

* cited by examiner

SYSTEMS AND METHODS FOR DYNAMICALLY GENERATING USER INTERFACES FOR CONTROLLING A DEVICE WITH A CLIENT SIDE FILTER

TECHNICAL FIELD

The present invention relates generally to computers and computer-related technology. More specifically, the present invention relates to systems and method for dynamically generating user interfaces for controlling a device with a client side filter.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals, a printer pool, a printer cluster, a fax machine, a plotter, a scanner, a logical device, an electronic whiteboard, a tablet PC, a computer monitor, a file, etc.

Different kinds of computer software facilitate the use of imaging devices. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

Computers may communicate with a server over the computer network. In a computer network environment, computers may be referred to as clients. Servers may manage one or more than one imaging devices, such as a printer. When a user desires to control an imaging device, the user may request information regarding the devices managed by the server. The user may receive information regarding every managed device even though many of the imaging devices may not possess certain capabilities desired by the user. Benefits may be realized by providing systems and methods for dynamically generating user interfaces for controlling a device with a client side filter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
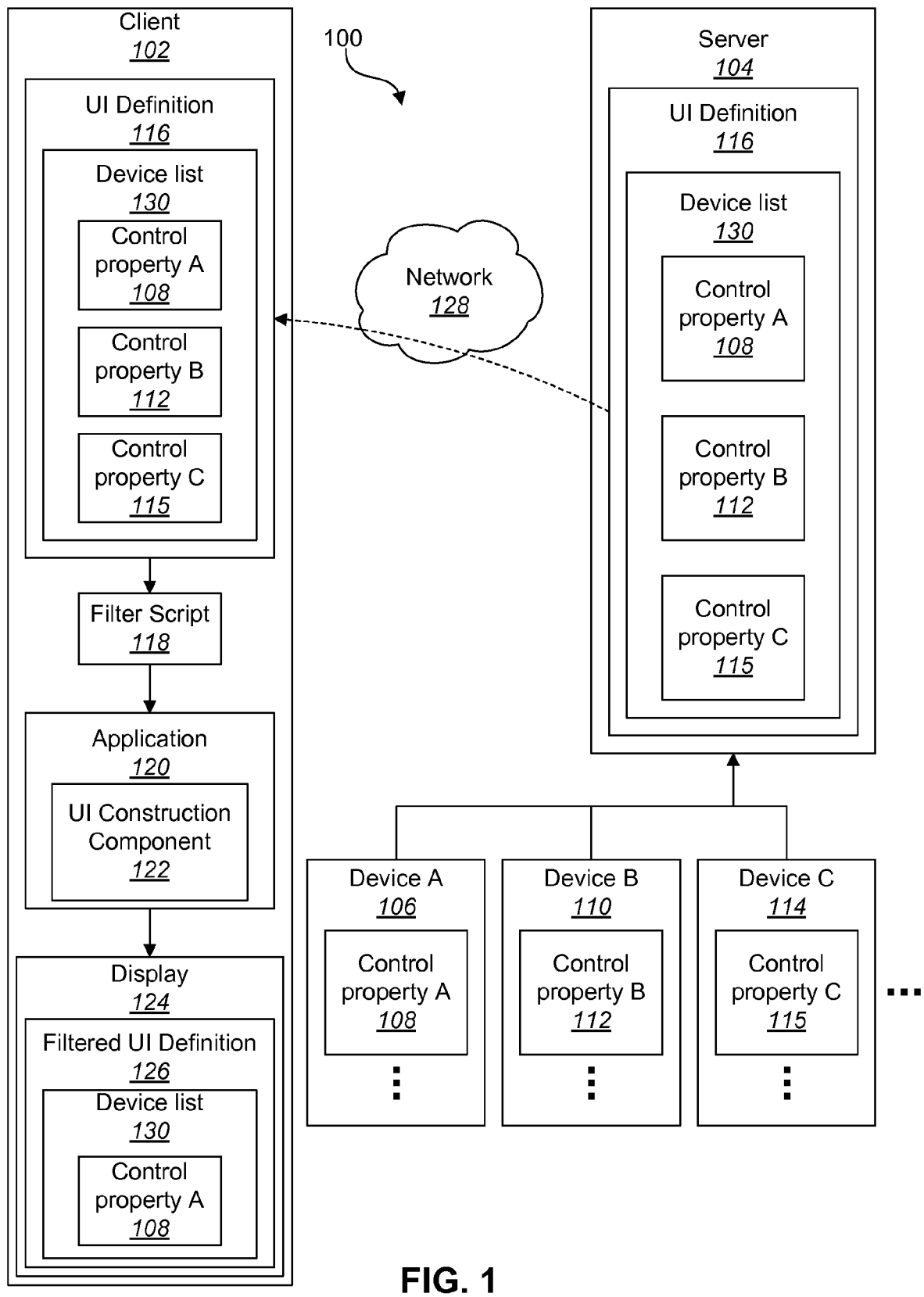
FIG. 1 is a block diagram illustrating one embodiment of a client-server environment in which embodiments may be practiced.

A method for dynamically constructing a user interface definition is disclosed. A request for an information list is sent. The user interface definition with the information list is received. A filter script is applied to the user interface definition. The filtered user interface definition is sent to an application. The filtered user interface definition is constructed. The filtered user interface definition is displayed.

In one embodiment, the information list is a device list. The request may be written in an extensible markup language format. In one embodiment, the filter script is written in an extensible markup language. A pre-determined filter script may be applied to the user interface definition. In one embodiment, a pre-configured filter script is static and is applied to multiple user interface definitions.

In one embodiment, a filter script is selected based on a type of user interface definition. In another embodiment the filter script is selected based on a transmission protocol of the user interface definition. In another embodiment, the filter script is selected based on a data protocol of the user interface definition. A preview of the user interface may be generated before applying the filter script to the user interface. The filter script may be embedded in a server.

A client that is configured to dynamically construct a user interface definition is also disclosed. The client includes a processor and memory in electronic communication with the processor. Instructions are stored in the memory. A request for an information list is sent. The user interface definition with the information list is received. A filter script is applied to the user interface definition to provide a filtered user interface definition. The filtered user interface definition is sent to an application. The filtered user interface definition is constructed. The filtered user interface definition is displayed.

A server that is configured to dynamically construct a user interface definition is also disclosed. The server includes a processor and memory in electronic communication with the processor. Instructions are stored in the memory. A request for an information list is received. The user interface definition with the information list is constructed. A filter script is applied to the user interface definition to provide a filtered user interface definition. The filtered user interface definition is constructed. The filtered user interface definition is sent to a client.

A computer-readable medium comprising executable instructions for implementing a method for dynamically constructing a user interface definition is also disclosed. A request for an information list is sent. The user interface definition with the information list is received. A filter script is applied to the user interface definition to provide a filtered user interface definition. The filtered user interface definition is sent to an application. The filtered user interface definition is constructed. The filtered user interface definition is displayed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Current research involves designing systems and methods for direct rendering (print, fax, scan, etc.) from a thin client using a rendering server. A thin client may be a computing device that depends primarily on the rendering server for processing activities. The rendering server may use direct print application programming interface (DPAPI) as the underlying mechanism for direct print/fax.

Clients may include direct print applications, such as Color data path unit (DPU), which uses the DPAPI on the client side. For systems with thin clients, the DPAPI may be running on the rendering server side. The thin client may not provide any printing services. The thin client may include a generic application whose user interface (UI) and interpretation of the UI responses is controlled by the rendering server, using extensible markup language (XML) messaging.

The standard way of using XML messaging for UI is to describe the UI properties, such as name, data, type, range and default value. The thin client may then interpret the UI properties and render a UI specific to the thin client (e.g., operating system (OS)/Application independent). A problem with this method arises in that there is no method of filtering the information received by the thin client without either support at the rendering server, or the thin client having intrinsic knowledge of the UI properties. For example, when the thin client makes a request for a list of printers managed by the rendering server, the server may send an XML message including a list of all the printers. If a user of the thin client was only interested in printers with duplex capabilities, the user may be required to parse through the rendered UI of each printer to determine which printers support duplex functions. Systems and methods for the user to filter the UI properties sent in an XML message to provide a subset of the information sent by the rendering server may be beneficial.

FIG. 1 is a block diagram illustrating one embodiment of a client-server environment 100. A client 102 and a server 104 may communicate over a network 128. In one embodiment, the client 102 may include a desktop computer, laptop computer, mini personal computer (PC), mainframe PC, hybrid client, fat client, thin client and the like. A thin client may be a computing device that depends primarily on the server 104 for processing activities. In one embodiment, a thin client may include a personal digital assistant (PDA), terminal, cell phone, etc.

The server 104 may manage and communicate with device A 106, device B 110 and device C 114. For clarity purposes, only three devices are illustrated. However, the server 104 may manage and communicate with many more devices. In one embodiment, devices A 106, B 110 and C 114 may be a printer, scanner, copier, facsimile device, filing device, conversion device, publishing device, electronic whiteboard, audio/video recorder/player, video projector, etc. In a further embodiment, the devices A 106, B 110 and C 114 may also be an X-ray, magnetic resonance imaging (MRI) or computer axial tomography (CAT) scan device.

Device A 106 may include control property A 108. Control property A 108 may represent particular performance capabilities of device A 106. Similarly, device B 110 may include control property B 112 and device C 114 may include control property C 115. While devices A 106, B 110 and C 114 are illustrated with only one control property, each device may include numerous control properties to represent the various performance capabilities of the device.

For illustrative purposes, devices A 106, B 110 and C 114 may be a printer. An example of a control property associated with a printing device is collation which indicates the ability of the printer to print multiple copies, copy collate, print face up/down, etc. Another example may be sheet assembly which indicates the ability of the printer to print on both sides of a sheet of paper (duplex), assemble a print job as a booklet, tri-fold the pages of the print job, print multiple pages at a reduced size on one sheet of paper (N-up), orientate the pages, tab the pages, etc. A further example of a control property may include rendering which indicates the ability of the printer to print with respect to color space, half-toning, toner save, resolution, image enhancement, etc. Another example may include finishing which indicates the ability of the printer regarding stapling, punching, folding, trimming, cutting, etc. A further example may be paper that may refer to the paper source, paper size, paper type, etc. of a printer. Another example may be outputting which may refer to the characteristics of an output bin of a printer, the ability of a printer to print carbon copies, transparencies, post fuser insertion, front/back covers, etc.

In one embodiment, devices A 106, B 110 and C 114 may communicate their respective control properties to the server 104. The server 104 may be a rendering server 104 with the capability to process and produce a user interface (UI) definition 116. The UI definition 116 may represent the aggregate means by which a user interacts with a particular computing device, such as the client 102. The UI definition 116 may provide the means for the user to control devices managed by the server 104. The UI definition 116 may include a device list 130. The device list 130 may include the identifications of devices A 106, B 110 and C 114 and their respective control properties. In a further embodiment, the device list 130 may also include information regarding the status of the devices in communication with the server 104. The device list 130 may also include notifications regarding jobs associated with the devices.

In one embodiment, the UI definition 116 is communicated to the client 102 over the network 128. The network 128 may include a personal area network (PAN), local area network (LAN), metropolitan area network (MAN), wide area network (WAN), wireless network, paging network, etc. The client 102 may include a filter script 118 which may facilitate filtering information from the UI definition 116. The client 102 may also include an application 120 which may include a UI construction component 122. The construction component 122 may render a filtered UI definition 126 to a display 124. A user may access the display 124 to view the filtered UI definition 126. In one embodiment, the filtered UI definition 126 may include the device list 130. The device list 130 may include the identification of the device that includes control property A 108, such as device A 106. In one embodiment, information regarding devices B 110 and C 114 are not included in the device list 130 of the filtered UI definition 126 because the filter script 118 may have filtered out the information.

Figure 2:
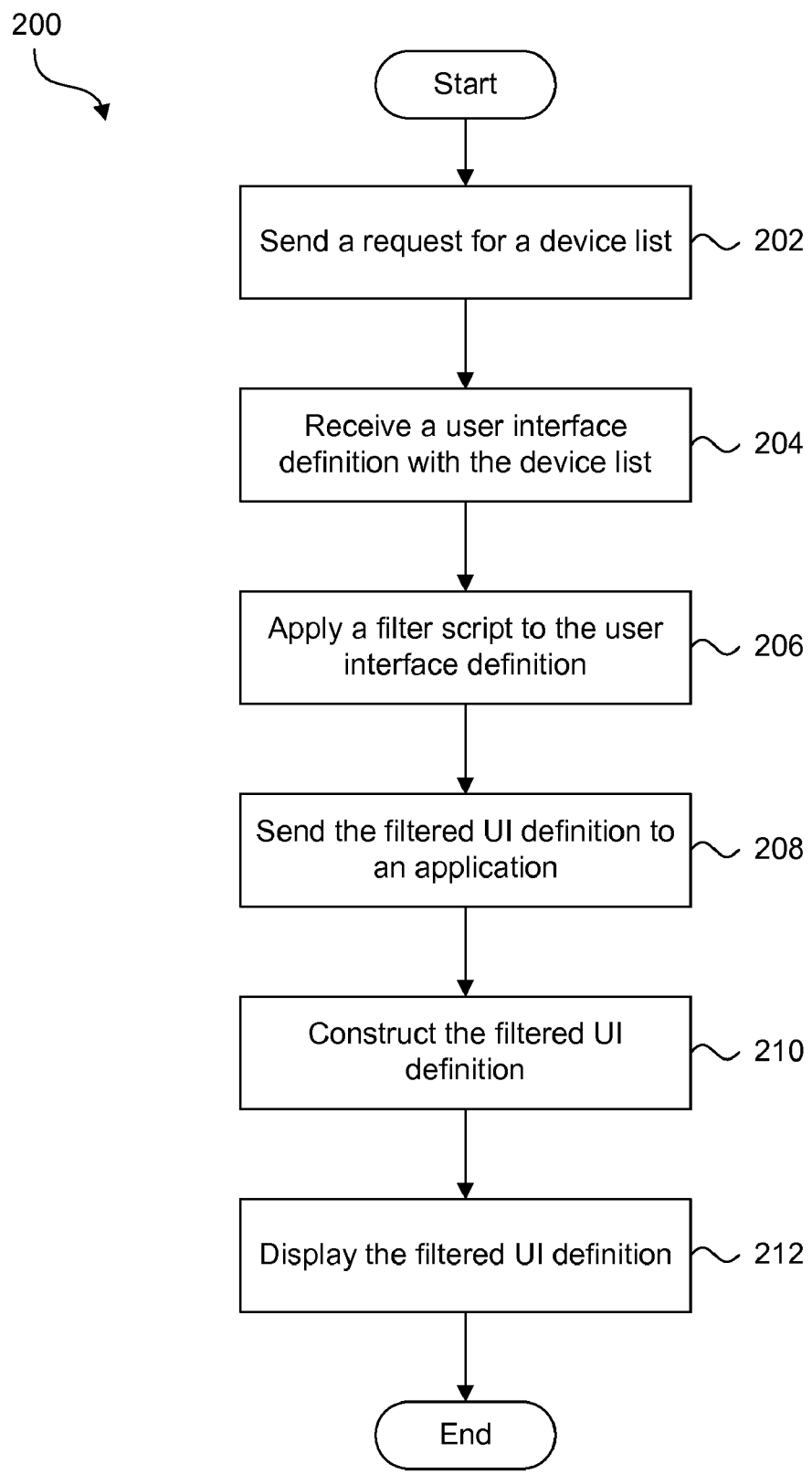
FIG. 2 is a flow diagram illustrating one embodiment of a method for constructing a dynamic user interface (UI) definition.

FIG. 2 is a flow diagram illustrating one embodiment of a method 200 for constructing a dynamic UI definition 116. In one embodiment, the method 200 may be implemented by the client 102, such as a thin client. A request for the device list 130 is sent 202. In one embodiment, the request message may be an extensible markup language (XML) message. An XML message may facilitate the sharing of data across different systems, such as a client-server environment. In a further embodiment, the request message may be any other type of format suitable for communications between systems.

The request may be sent 202 to the server 104 which may include a request for a list of all the devices with certain control properties. In a further embodiment, the request may include a request for the status of certain devices managed by the server 104. In another embodiment, the request may include a request for the status of jobs executed by certain devices managed by the server 104.

A UI definition 116 may be received 204 with the device list 130. In one embodiment, the device list 130 may include the identifications of all the devices managed by the server 104. In one embodiment, the format of the UI definition 116 may be independent of the application 120. In other words, the format of the UI definition 116 may not define the layout of the UI for the application 120.

In one embodiment, a filter script 118 is applied 206 to the UI definition 116 that includes the device list 130. In one embodiment, the filter script 118 may include the XML format. The filtered UI definition 126 may be sent 208 to the application 120. The filtered UI definition 126 may be constructed 210 and displayed 212. In one embodiment, the UI construction component 122 of the application 120 constructs 210 the filtered UI definition 126. The filtered UI definition 126 may include the device list 130 and may be in formats such as XML, proprietary data format, etc. In one embodiment, the device list 130 may include a list of the devices managed by the server 104 which include a certain control property. The filtered UI definition 126 may be displayed 212 to a user. The user may control the device(s) included in the device list 130 through the dynamically constructed filtered UI definition 126.

Figure 3:
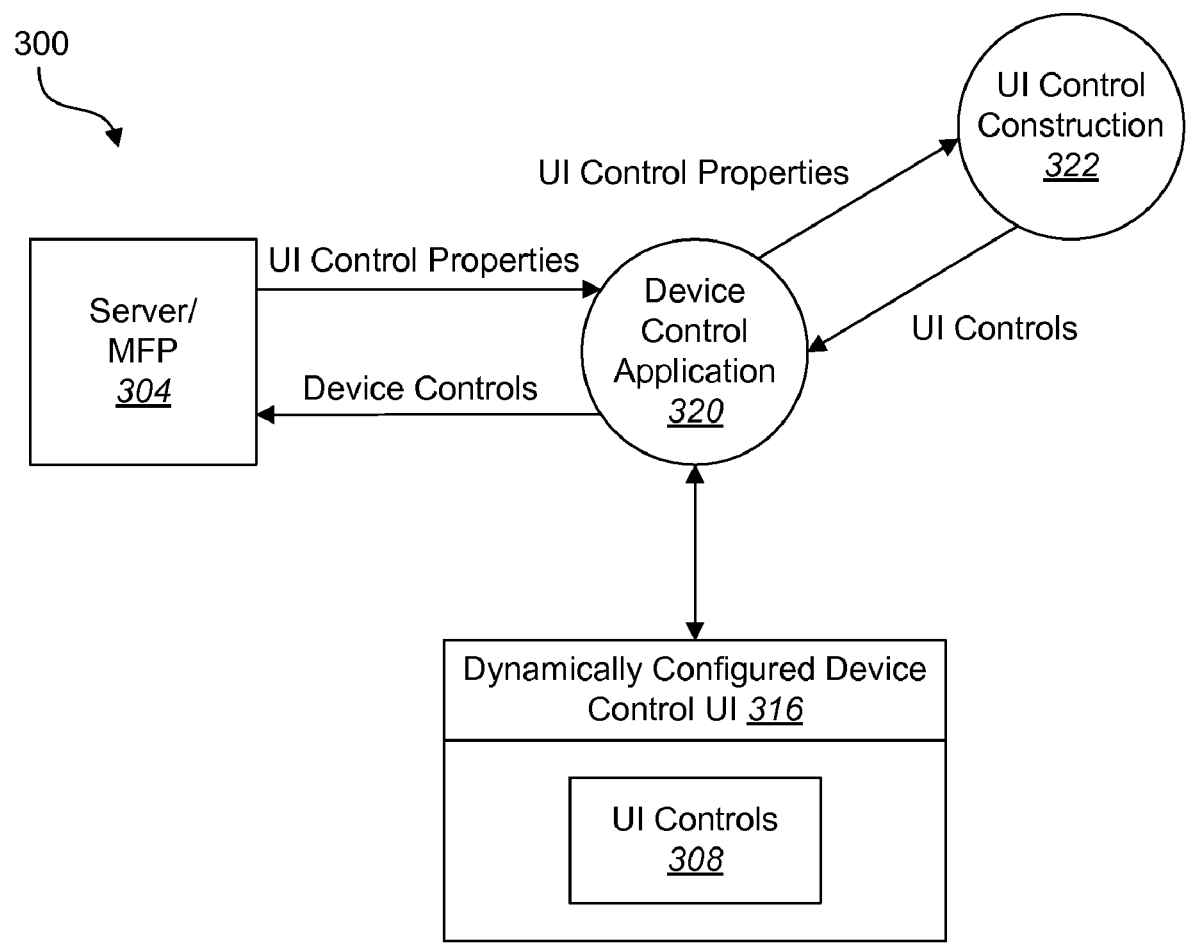
FIG. 3 is a block diagram illustrating one embodiment of an operating environment where embodiments of the present systems and methods may be practiced.

FIG. 3 is a block diagram illustrating one embodiment of an operating environment 300 where embodiments of the present systems and methods may be practiced. The environment 300 may include a server 304. In one embodiment, the server 304 may be a multi-functional peripheral (MFP) server. A device control application 320 may provide a request for device controls to the server 304. The device control request may include a request for access to controls to enable a user to control devices (not shown) managed by the server 304.

The server 304 may send the control properties to the application 320. In one embodiment, the control properties are included within a user interface definition 116. The UI definition 116 and control properties may be communicated to a UI control construction component 322. The construction component 322 may render a UI for controlling the device (not shown) based on the UI control properties. The UI controls may be rendered in a manner that is specific to the application 320. A dynamically configured device control UI 316 may be rendered which includes the UI controls 308 which may allow a user to control the device (not shown).

Figure 4:
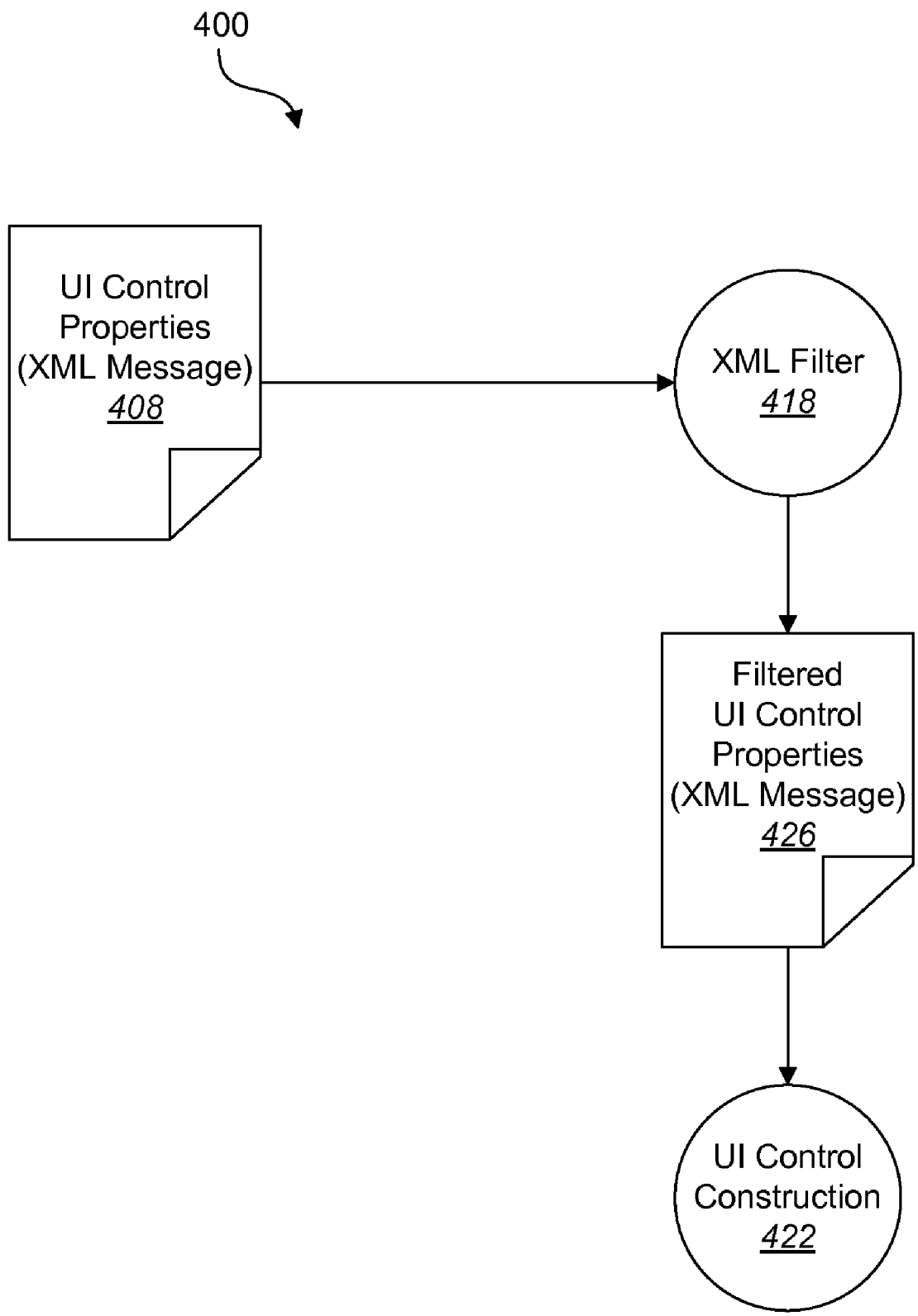
FIG. 4 is flow diagram illustrating further embodiment of a method for filtering and dynamically constructing a user interface definition.

FIG. 4 is flow diagram illustrating another embodiment of a method 400 for filtering and dynamically constructing a user interface definition 116. In one embodiment, a UI control properties message 408 is sent to a filter 418. The UI control properties message 408 may include an XML message. The filter 418 may be an XML filter. The selection of the filter 418 may be based on numerous methods. For example, the filter 418 may be pre-determined. In another embodiment, the filter 418 may be pre-configured by an administrator of a user. The filter 418 may also be selected on-the-fly manually by a user or the filter 418 may be selected on-the-fly based on some other criteria.

In addition, the filter 418 may be static to a session (i.e., unchanging), and the same filtering script may be applied to each XML message 408, regardless of the type, form or content of the message 408. In one embodiment, the selection of the filter 418 may be based on the type of message 408. For example, the XML message 408 may include a header that uniquely defines the type of message, such as device selection list, device information, device capabilities, device settings/controls, job selection, job notification, etc.

In another embodiment, the filter script 418 may be selected depending on the transmission protocol of the message 408 such as user datagram protocol (UDP), transmission control protocol IP (TCP/IP), AppleTalk, etc. The filter script 418 may also be selected depending on the data protocol of the message 408 such as hypertext transfer protocol (HTTP), direct internet message encapsulation (DIME), XML, etc. The filter script 418 may also be selected depending on the port from where the message 408 was sent or received, the internet protocol (IP) address of the sender, etc.

In a further embodiment, the filter script 418 may be selected based on some aspect of the content of the message 408. For example, the presence or absence of some content in the message 408, such as a node, attribute or value in XML. The filter script 418 may also be selected based on a data object set, or not set, to a value or a value range, etc.

The filtered UI rendering message 426 may be communicated to the UI control construction component 422 to render the UI. In one embodiment, the construction component 422 may be included in the application 120. The construction component 422 may render the UI according to the filtered message 426. The following illustrates an example of implementing the method 400.

In one embodiment, the filtering process may be designed such that the filtering process applies the filter script 418 to messages 408 that include a device selection message. In one embodiment the device may be a printer. The filter script 418 may remove any printer from the message 408 that includes a content element which does not include the desired capability. For example, the desired capability may include a printer with duplex capabilities. Below is an example of one embodiment of a message 408 including a device selection message. The message may be in XML format.

```
<action type="PrinterSelection">
    <printers>
        <printer name="MyPrinter1">
            <capabilities>
                <duplex>YES</duplex>
                <staple>NO</staple>
                <color>YES</color>
            </capabilities>
        </printer>
        <printer name="MyPrinter2">
            <capabilities>
                <duplex>NO</duplex>
                <staple>NO</staple>
                <color>NO</color>
            </capabilities>
        </printer>
        <printer name="MyPrinter3">
            <capabilities>
                <duplex>YES</duplex>
                <staple>YES</staple>
                <color>YES</color>
            </capabilities>
        </printer>
    </printers>
</action>
```

Criteria associated with the filter script 418 may be defined as follows:

```
IF XML.node == "action" AND
    XML.attribute == "type" AND
        XML.value == "PrinterSelection"
THEN
    APPLY filter.duplex_only
ENDIF
```

The filter script 418 including "filter.duplex_only" may be defined as follows:

```
IF XML.node == "printer" THEN
    Child = XML.child
    IF Child.node == "capabilities" THEN
        FOREACH Grandchild in Child.child DO
            IF Grandchild.node == "duplex" AND
                Grandchild.value != "YES" THEN
                    REMOVE XML.node
            ENDIF
        NEXT
    END IF
END IF
```

After the filter script 418 including "filter.duplex_only" is applied to the above sample XML message, the filtered message 426 may be defined as follows:

```
<action type="PrinterSelection">
    <printers>
        <printer name="MyPrinter1">
            <capabilities>
                <duplex>YES</duplex>
                <staple>NO</staple>
                <color>YES</color>
            </capabilities>
        </printer>
        <printer name="MyPrinter3">
            <capabilities>
                <duplex>YES</duplex>
                <staple>YES</staple>
                <color>YES</color>
            </capabilities>
        </printer>
    </printers>
</action>
```

In another example, an administrator may design the filter script 418 to restrict the use of a stapling capability in device, when the type of message 408 includes device settings. In this example, the filter script 418 may remove any device setting selection that includes a content element that does include a stapling setting. Below is an example of one embodiment of a device setting message, in XML format.

```
<action type="PrinterSettings">
    <printer name="MyPrinter1">
        <settings>
            <copies datatype=int range="1..999" />
            <duplex datatype=bool />
            <staple datatype=bool />
        </settings>
    </printer>
</action>
```

The criteria of the filter 418 may be defined as follows:

```
IF XML.node == "action" AND
    XML.attribute == "type" AND
    XML.value == "PrinterSettings"
THEN
    APPLY filter.no_staple_setting
ENDIF
```

The filter script 418 "filter.no_staple_setting" may be defined as follows:

```
IF XML.node == "settings" THEN
    FOREACH Child in XML.child DO
        IF Child.node == "staple" THEN
            REMOVE Child.node
        ENDIF
    NEXT
END IF
```

After the filter script 418 "filter.no_staple_setting" is applied to the above sample XML message, the filtered XML message 426 may be defined as follows:

```
<action type="PrinterSettings">
    <printer name="MyPrinter1">
        <settings>
            <copies datatype=int range="1..999" />
            <duplex datatype=bool />
        </settings>
    </printer>
</action>
```

Figure 5:
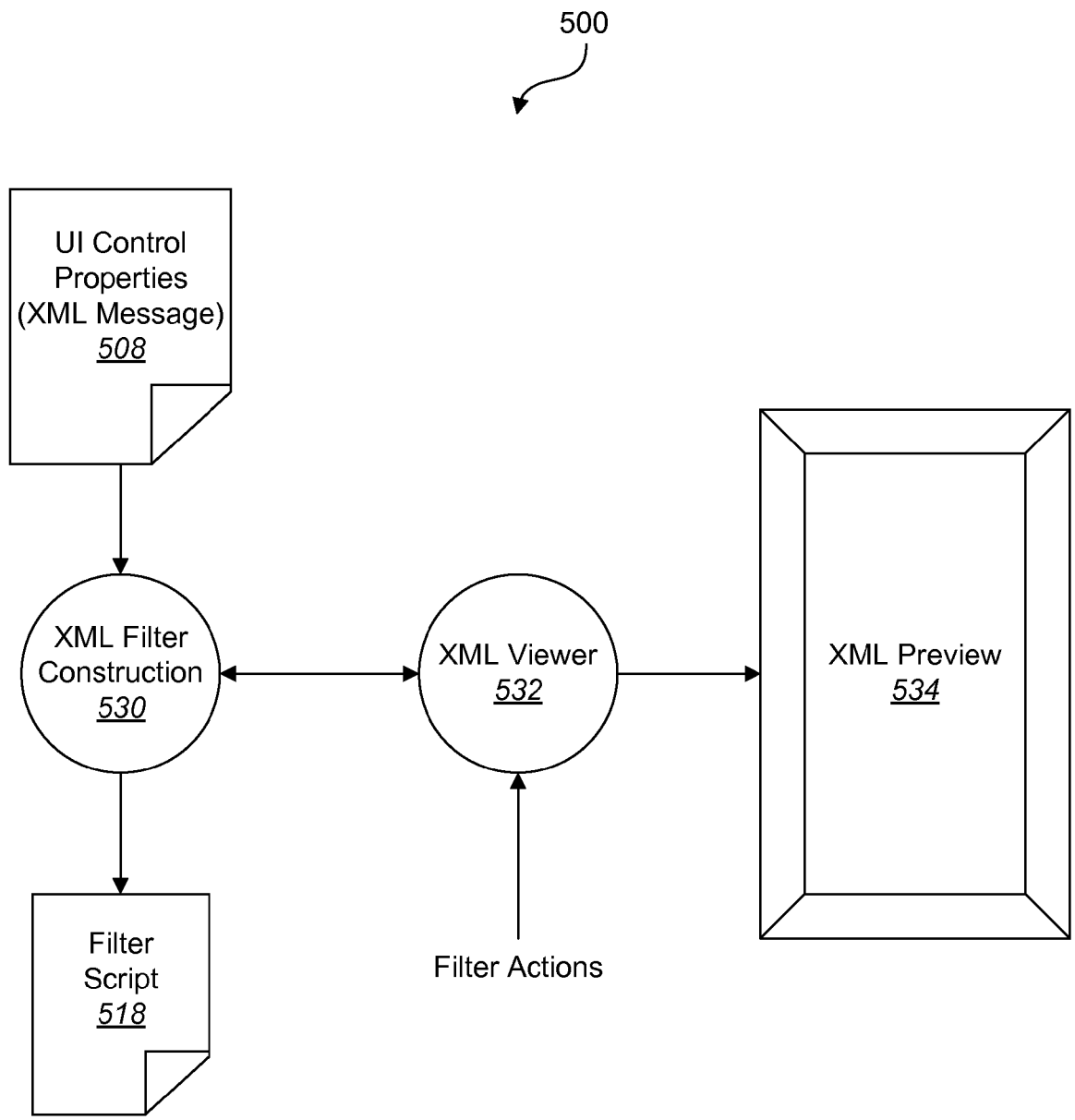
FIG. 5 is a flow diagram illustrating one embodiment of a method for determining whether or not to apply a filter script.

FIG. 5 is a flow diagram illustrating one embodiment of a method 500 for determining whether or not to apply a filter script 518. The method 500 facilitates a user to preview an unfiltered message 508 and determine whether or not to apply the filter script 518 to the message 508. In one embodiment, a user may construct and name numerous filter scripts. The varying filter scripts may perform various functions as illustrated above with the examples of the filter scripts "filter.duplex_only" and "filter.no_staple_setting."

In one embodiment, the UI control properties (XML message) 508 is sent to the construction control component 122 within an application 120 on the client 102. The client 102 may be a thin client as previously explained. The message 508 may be sent to the construction control component 122 without having passed through a filtering script 518.

In one embodiment, a user may interact with the control component 122 when the message 508 is received. The user may initiate interaction by enabling an edit button. In one embodiment, the control component 122 may enable a viewer 532 that facilitates the user to preview the unfiltered message 508 utilizing a preview window 534. In one embodiment, the viewer 532 may be an XML viewer and the preview window 534 may enable a use to view XML messages 508.

The user may utilize the preview window 534 to view the message 508 and determine if the filter script 518 should be applied to the message 508. For example, the user may preview a message including a list of printers managed by the server 104. The list may be extensive and the user may desire to apply a filter script in order to condense the list to include only the printers that possess the capabilities desired by the user.

The user may specify a particular filter script to apply to the message 508 by providing the name of the filter script 518 to a filter construction component 530. The filter construction component 530 may generate the particular filter script 518 desired by the user. In addition, the user may determine which filter script 518 to apply by providing commands to apply the filter script 518 associated with the particular type of message 508. For example, if the type of the message 508 is "printer settings" the user may determine to apply the filter script 518 associated with this type of messages 508. In a further embodiment, the user may provide the filter actions associated with the desired filter script 518. The filter actions may be manually entered into the filter construction component 530. Alternatively, the filter actions may be automatically generated by the filter construction component 530. In one embodiment, the filter construction component 530 may automatically generate the filter actions in response to the user highlighting nodes, attributes or values associated with the message 530. Additionally, the filter construction component 530 may generate the filter actions in response to the user selecting combinations of dialog buttons. When the desired filter script 518 is selected, the user may apply the script 518 immediately to the UI message 518. Alternatively, the user may save the generated script 518 for subsequent or temporary use.

In another embodiment, the construction component 122 may generate a preview of a filtered UI message 126 immediately upon receipt of the message 508. The construction component 530 may automatically generate a preview of the filtered message 126 by applying a pre-existing filter script 518 associated with the UI message 508. In one embodiment, the user may view the filtered message 126 and elect to modify the filtered message 126 by modifying the script 518. The user may modify the filter script for a one-time use or the user may save the modified filter script for subsequent use.

Figure 6:
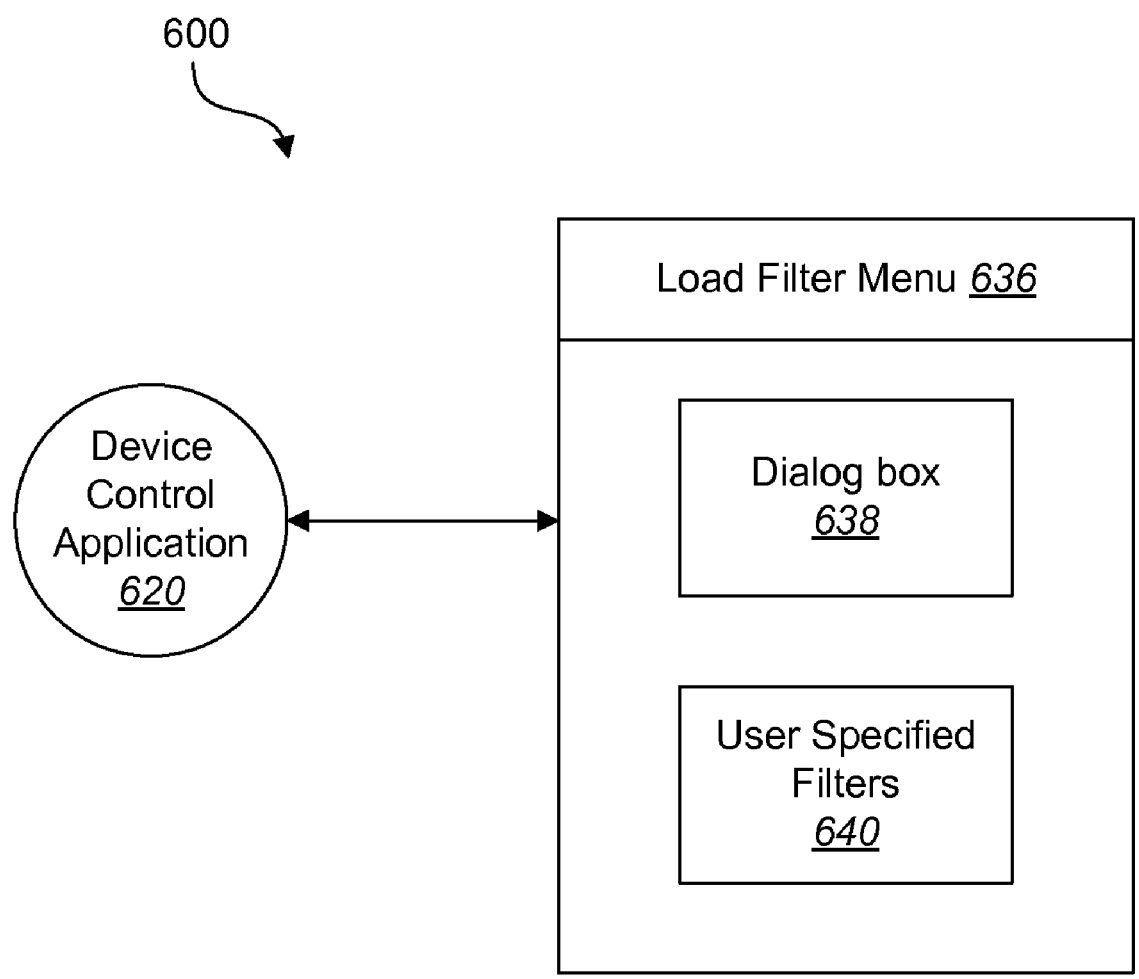
FIG. 6 is a block diagram illustrating one embodiment of a device control application which may load a filter script.

FIG. 6 is a block diagram illustrating one embodiment 600 of a device control application 620 which may load a filter script 118. In one embodiment, a user may construct a filter script 118 and load the script 118 either automatically or manually. In one embodiment, if the user manually loads the script 118, the user may invoke the device control application 620 on a thin client and manually load into the application 620 the filter scripts 118. In one embodiment, the user may load the scripts 118 into the application 620 through a load filter menu 636 that utilizes a load filter dialog box 638. The load filter menu 636 may then include user specified filters 640 which may be used to filter messages as previously explained.

While the embodiments herein discussed include UI messages in an XML format, any format may be used, such as HTTP, DIME, extensible application markup language (XAML), a proprietary data format, etc. In other embodiment, the UI messages may be applicable for any device control or operation, such as scanning, faxing, archiving, copying, filing, publishing, conversion, and computing. In another embodiment, the filter scripts may be uploaded by a client (such as a thin client) to a rendering server. The filtering process may be executed on the rendering server and the filtered messages may be sent back to the client.

In another embodiment, messages may be associated with a schema for validation. For example, when messages contain rich (extra) content not known or recognized by a validator, the message may be pre-filtered to remove the rich content for validation against a schema. The pre-filtered message may then be rendered into a user interface by the client.

Figure 7:
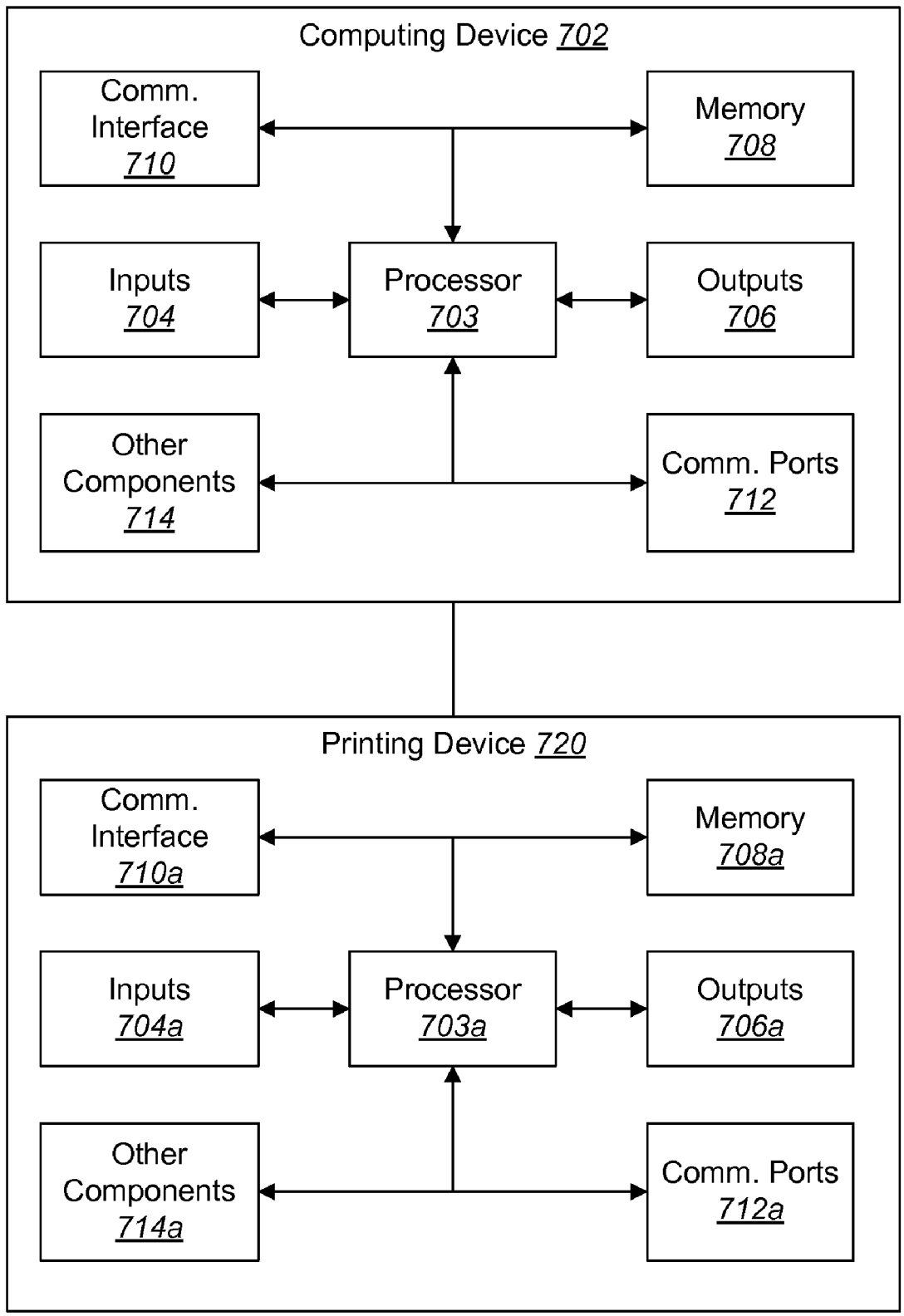
FIG. 7 is a block diagram illustrating the major hardware components typically utilized with embodiment herein.

FIG. 7 is a block diagram illustrating the major hardware components typically utilized with embodiments herein. The systems and methods disclosed may be used with a computing device 702 and a printing device 720. The major hardware components typically utilized in a computing device 702 are illustrated in FIG. 7. A computing device 702 typically includes a processor 703 in electronic communication with input components or devices 704 and/or output components or devices 706. The processor 703 is operably connected to input 704 and/or output devices 706 capable of electronic communication with the processor 703, or, in other words, to devices capable of input and/or output in the form of an electrical signal. Embodiments of devices 702 may include the inputs 704, outputs 706 and the processor 703 within the same physical structure or in separate housings or structures.

The electronic device 702 may also include memory 708. The memory 708 may be a separate component from the processor 703, or it may be on-board memory 708 included in the same part as the processor 703. For example, microcontrollers often include a certain amount of on-board memory.

The processor 703 is also in electronic communication with a communication interface 710. The communication interface 710 may be used for communications with other devices 702, printing devices 720, servers, etc. Thus, the communication interfaces 710 of the various devices 702 may be designed to communicate with each other to send signals or messages between the computing devices 702.

The computing device 702 may also include other communication ports 712. In addition, other components 714 may also be included in the electronic device 702.

Many kinds of different devices may be used with embodiments herein. The computing device 702 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 7 is only meant to illustrate typical components of a computing device 702 and is not meant to limit the scope of embodiments disclosed herein.

The computing device 702 is in electronic communication with the printing device 720. A printing device 720 is a device that receives or transmits an imaging job, such as a Multi-Function Peripheral ("MFP") or computing device. Printing devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. A typical printing device, such as a physical printer, fax machine, scanner, multi-functional peripheral or copier is a type of computing device. As a result, it also includes a processor, memory, communications interface, etc., as shown and illustrated in relation to FIG. 7. The printing device may be a single or a plural grouping (e.g., pool or cluster) of two or more devices.

Figure 8:
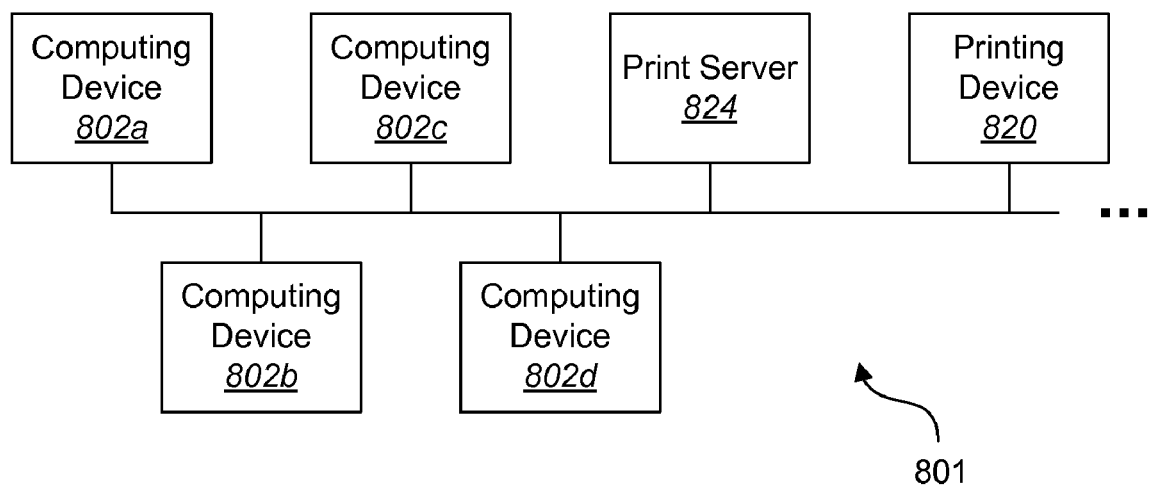
FIG. 8 is a network block diagram illustrating one possible environment in which the present systems and methods may be implemented.

FIG. 8 is a network block diagram illustrating one possible environment in which the present systems and methods may be implemented. The present systems and methods may also be implemented on a standalone computer system. FIG. 8 illustrates a computer network 801 comprising a plurality of computing devices 802, a printing device 820 and a print server 824.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for dynamically constructing a user interface definition, the method comprising:
sending a request for an information list, the information list comprising a device list having one or more control properties associated with each device on the device list;

receiving the user interface definition with the information list;

applying a filter script to the user interface definition to provide a filtered user interface definition, wherein the filtered user interface definition is a subset of the user interface definition, wherein the filter script is selectable and filters based on one or more specific control properties, wherein the control properties comprise printer capabilities, and wherein the filtering removes from the device list any device that does not include the one or more specific control properties such that the device list within the filtered user interface definition comprises a subset of devices within the user interface definition;

sending the filtered user interface definition to an application;

constructing the filtered user interface definition;

displaying the filtered user interface definition; and facilitating user control of any device within the subset of devices that are included in the displayed filtered user interface definition.

2. The method of claim 1, wherein the request is written in an extensible markup language format.

3. The method of claim 1, wherein the filter script is written in an extensible markup language.

4. The method of claim 1, further comprising applying a pre-determined filter script to the user interface definition.

5. The method of claim 1, further comprising applying a pre-configured filter script that is static to multiple user interface definitions.

6. The method of claim 1, further comprising selecting a filter script based on a type of user interface definition.

7. The method of claim 1, further comprising selecting a filter script based on a transmission protocol of the user interface definition.

8. The method of claim 1, further comprising selecting a filter script based on a data protocol of the user interface definition.

9. The method of claim 1, further comprising generating a preview of the user interface before applying the filter script to the user interface.

10. The method of claim 1, wherein the filter script is embedded in a server.

11. A client that is configured to dynamically construct a user interface definition, the client comprising:

a processor;

memory in electronic communication with the processor;

executable instructions executable by the processor, wherein the instructions are executable to:

send a request for an information list, the information list comprising a device list having one or more control properties associated with each device on the device list;

receive the user interface definition with the information list;

apply a filter script to the user interface definition to provide a filtered user interface definition, wherein the filtered user interface definition is a subset of the user interface definition, wherein the filter script is selectable and filters based on one or more specific control properties, wherein the control properties comprise printer capabilities, and wherein the filtering removes from the device list any device that does not include the one or more specific control properties such that the device list within the filtered user interface definition comprises a subset of devices within the user interface definition; send the filtered user interface definition to an application;

construct the filtered user interface definition;

display the filtered user interface definition; and facilitate user control of any device within the subset of devices that are included in the displayed filtered user interface definition.

12. The client of claim 11, wherein the request is written in an extensible markup language format.

13. The client of claim 11, wherein the filter script is written in an extensible markup language.

14. The client of claim 11, wherein a pre-determined filter script is applied to the user interface definition.

15. The client of claim 11, wherein the filter script is selected based on a type of user interface definition.

16. The client of claim 11, wherein the filter script is selected based on a transmission protocol of the user interface definition.

17. A server that is configured to dynamically construct a user interface definition, the server comprising:

a processor;

memory in electronic communication with the processor;

executable instructions executable by the processor, wherein the instructions are executable to:

receive a request for an information list, the information list comprising a device list having one or more control properties associated with each device on the device list;

construct the user interface definition with the information list;

apply a filter script to the user interface definition to provide a filtered user interface definition, wherein the filtered user interface definition is a subset of the user interface definition, wherein the filter script is selectable and filters based on one or more specific control properties, wherein the control properties comprise printer capabilities, and wherein the filtering removes from the device list any device that does not include the one or more specific control properties such that the device list within the filtered user interface definition comprises a subset of devices within the user interface definition;

construct the filtered user interface definition;

send the filtered user interface definition to a client; and facilitate user control of any device within the subset of devices that are included in the sent filtered user interface definition.

18. A computer-readable medium comprising executable instructions for dynamically constructing a user interface definition, the instructions being executable to:

send a request for an information list, the information list comprising a device list having one or more control properties associated with each device on the device list;

receive the user interface definition with the information list;

apply a filter script to the user interface definition to provide a filtered user interface definition, wherein the filtered user interface definition is a subset of the user interface definition, wherein the filter script is selectable and filters based on one or more specific control properties, wherein the control properties comprise printer capabilities, and wherein the filtering removes from the device list any device that does not include the one or more specific control properties such that the device list within the filtered user interface definition comprises a subset of devices within the user interface definition;

send the filtered user interface definition to an application;

construct the filtered user interface definition;

display the filtered user interface definition; and facilitate user control of any device within the subset of devices that are included in the displayed filtered user interface definition.

* * * * *